United States Patent [19]
Renner et al.

[11] 3,898,916
[45] Aug. 12, 1975

[54] SUPERVISION OF SEVERAL ELECTRO-HYDRAULIC ACTUATORS OPERATING ON A COMMON OUTPUT

[75] Inventors: Eckhart Renner, Achim; Udo Linnenbecker, Bremen, both of Germany

[73] Assignee: Vereinigte Flugtechnische Werke-Fokker GmbH, Bremen, Germany

[22] Filed: Apr. 4, 1974

[21] Appl. No.: 457,704

[30] Foreign Application Priority Data
Apr. 9, 1973   Germany............................ 2317754

[52] U.S. Cl........... 91/411 R; 91/411 A; 244/77 M; 60/DIG. 2
[51] Int. Cl.²........................................ F15B 11/22
[58] Field of Search.......... 91/411 R, 411 A, 411 B, 91/413; 60/DIG. 2; 244/77 M

[56] References Cited
UNITED STATES PATENTS
3,433,125   3/1969   Gemmell........................... 91/411 R
3,505,929   4/1970   Coppola et al.................... 91/411 B

*Primary Examiner*—Edgar W. Geoghegan
*Attorney, Agent, or Firm*—Ralf H. Siegemund

[57] ABSTRACT

Several electro-hydraulic actuators are supervised by means of comparators which compare respective two actuators whereby each actuator is connected to two comparators to obtain a closed comparison loop. The comparators are, for example, of the differential piston variety comparing the actuator chamber on one or both sides of the piston therein with the comparable chamber or chambers in another actuator. Alternatively, the outputs of pressure cells, individually connected to the actuators, are compared. The comparison signals in either case are paired in that the outputs of the comparators connected to the same actuator are combined to control or shut down the respective actuator. Additional comparators may be provided to permit each actuator to be compared with all others for establishing sub-loops which remain in-tact when one or more actuators have dropped out, so as to maintain the loop principle even when only three actuators remain operative.

16 Claims, 8 Drawing Figures

SUPERVISION OF SEVERAL ELECTRO-HYDRAULIC ACTUATORS OPERATING ON A COMMON OUTPUT

BACKGROUND OF THE INVENTION

The present invention relates to the supervision and control of redundant electro-hydraulic actuator systems constructed from several, single actuators. The redundant system is presumed to have at least three single units, and a supervising arrangement for eliminating faulty actuators.

High performance aircraft require high precision actuators for control. Moreover, reliability is of vital importance. Accordingly, it has been suggested to provide for redundant actuator systems having hydraulically operated piston/cylinder type actuators for the respective, several actuator units, each being controlled by a servo valve, and the piston rods are combined in some fashion to provide for a common displacement output. Single units by themselves are too unreliable so that at least two such hydraulic acutators are combined and can be regarded as a system offering a minimum redundancy. However, three or even four actuator units have been combined to a redundancy system. Each unit is individually supervised as to its accuracy. Small errors are either ignored or compensated through feedback control, large errors lead to shut down.

The German printed patent application No. 1,932,066 describes an actuator system with two and four units wherein auxiliary cylinders provide for supervision on the basis of pressure differences in two chambers of two cylinders. If differences arise, the piston in the respective auxiliary cylinder moves the tap of a potentiometer to generate an electrical signal which is used for a balancing control if small, but a large signal controls shut down of both actuators of a two unit system.

This particular mode of supervising a redundancy system has the advantage of simplicity over another mode of supervising according to which actuator operation is simulated on a running basis and compared with signal representation of the actual performance of an actuator. However, the device as described in this German patent application does not operate in an optimizing manner, because in case of error both actuators of a two unit system are shut down when only one of them is actually faulty.

Thus, two such two-unit systems, having altogether four units, will fail completely when only two units are faulty. This is a definite disadvantage because it requires the provision and turn-on of an emergency system, even though two actuators are still operable.

DESCRIPTION OF THE INVENTION

It is an object of the present invention to provide for supervision in a redundancy actuator system having several units which operate individually and which should remain operative even after one or more units have failed and had to be shut down.

It is another object of the present invention to provide for supervisory control in a multiple unit redundancy system which is still operational even when reduced to only two actuators.

In accordance with the preferred embodiment of the invention a plurality of individually controlled, electro-hydraulic actuators each having a piston/cylinder unit are supervised by a plurality of comparators each comparing the hydraulic conditions in an actuator cylinder with the hydraulic conditions in another actuator cylinder; the number of comparators is at least as large as the number of actuators and the comparators are arranged in a loop in that each actuator cylinder is compared with two others. Additional comparators can be used and comparisons can be made in a cross-link fashion, so that in the case of several shut downs, a comparison ring or loop still exists even when only three actuators remain operative. Only when the redundant system is reduced to two actuators will it no longer be possible to distinguish a correct from an incorrect operation. In all other cases, the faulty actuator can be singled out immediately.

The invention can be realized either by means of pressure comparators and differential pressure sensing systems or by pressure transducers providing electrical outputs, and comparison is made electrically among these output signals. The results of all comparisons made are preferably used for providing supplementary control for an individual actuator on which an error was discovered, as long as there is reason to believe that such control augmentation will remedy the situation; otherwise the actuator is shut down, and neutralized.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a somewhat schematic representation of an actuator system in accordance with one example of the preferred embodiment of the invention;

FIG. 1 a is a schematic diagram for processing individual supervisory output signals in FIG. 1;

Figures 1, 1A:
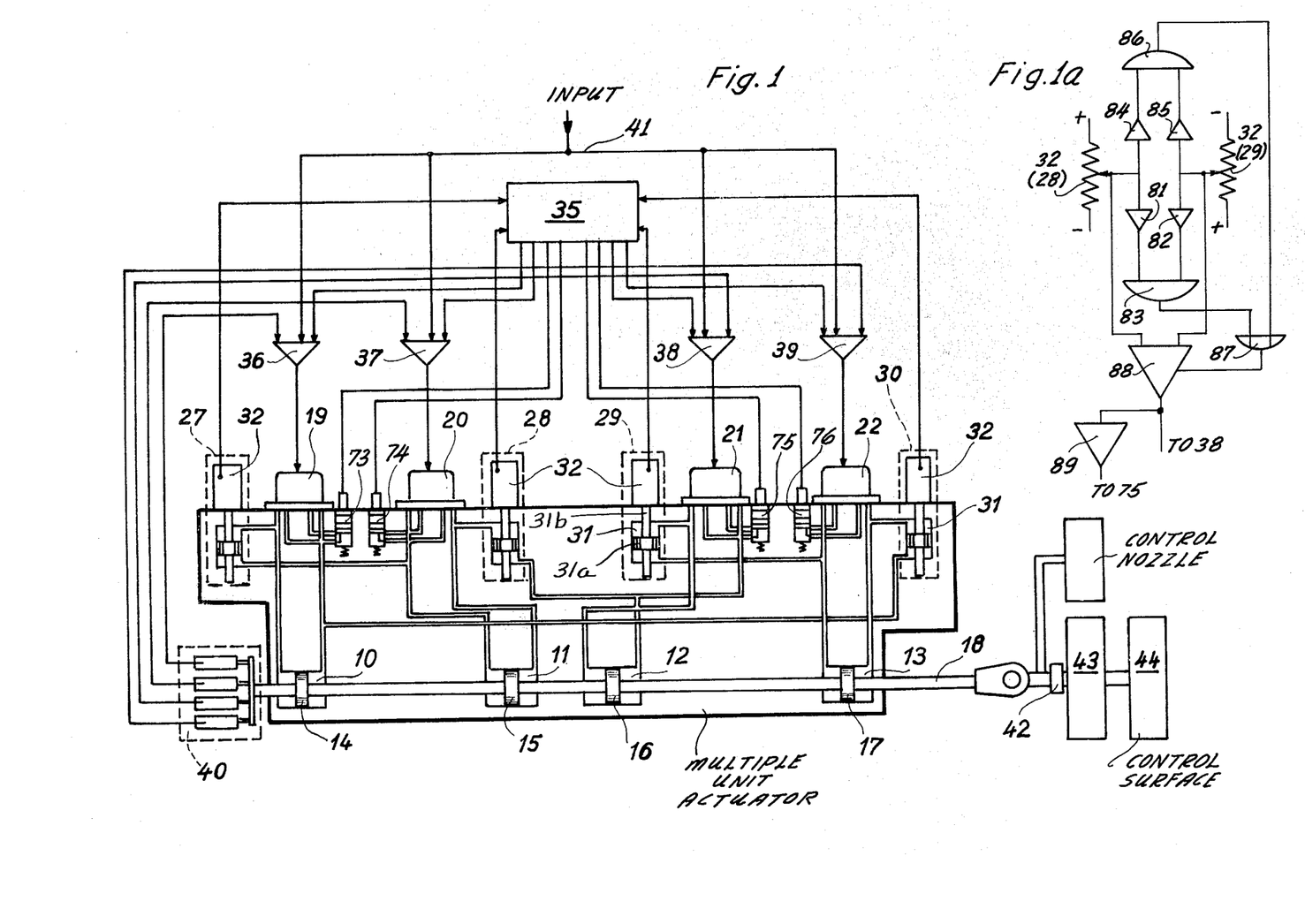

Proceeding now to the detailed description of the drawings, FIG. 1 illustrates a four-unit system constructed from the following elements. The principle elements are four actuators respectively having cylinders 10, 11, 12 and 13 with pistons 14, 15, 16 and 17 movably disposed therein, and a common piston rod 18. Each piston/cylinder arrangement is controlled by a servo valve, and the four servo valves are respectively denoted 19, 20, 21 and 22. One can say, that elements 10, 14, 19 constitute a first hydraulic actuator, elements 11, 15, 20 constitute the second one, 12, 16, 21 will then be the third actuator and 13, 17, 22 constitute the fourth one.

The actuator rod 18 may be linked to a control nozzle if the system is installed e.g. in a VTOL aircraft. The rod 18 will control the nozzle. Additionally, or alternatively, the rod 18 may be coupled to a power assist device 43 for hydraulically operating control surfaces 44 of the aircraft.

The valves are controlled in the following manner. Four error signal amplifiers 36, 37, 38 and 39 are provided, being for example of the differential variety and respectively controlling valves 19, 20, 21 and 22. Each amplifier receives an input provided on a common bus 41 for all amplifiers and constituting a command derived e.g. from a control stick of a pilot via a controller circuit, possibly also constructed as an electrical redundant system.

The common actuator rod 18 is coupled to a potentiometer unit 40, and moves respectively four taps or slides of four potentiometers. Four output signals are produced by unit 40 accordingly, each representing the actual disposition of actuator rod 18. These output signals are respectively fed to amplifiers 36 through 39 for negative feedback in that each amplifier produces a positive or negative output only as long as the feedback signal from the respective input is not opposite and equal to the command signal on bus 41.

Each amplifier 36 through 39 when providing a non-zero output of one or the other polarity controls the respective valve (19 through 22) to cause the respectively operated piston (14 through 17) to be moved in one or the opposite direction. The movement persists until the feedback has restored balance as to the combined input signals for each amplifier.

One can readily see, that the disposition of rod 18 following a displacement command on bus 41 is determined by the average of the actuation as provided by the four actuators. Ideally, each error amplifier servo valve system acts on the respective actuator piston (14 through 17) for the same time so that displacement control ceases concurrently on all pistons. Differences lead to pressure imbalance, small differences are used for obtaining a balancing control, large differences lead to shut down of the faulty unit, as will be described next.

The actuators are supervised by means of four signal transducers 27, 28, 29 and 30 respectively connected to the cylinders of the four actuator units. Each transducer is of the pressure differential variety and is comprised of an auxiliary cylinder and piston chamber 31 with piston 31a and piston rod 31b for displacing the tap of a potentiometer 32. The piston chambers 31 have their respective opposite sides, relative to the piston therein, connected to two different actuator cylinders in a ring or loop arrangement. Each pressure differential transducer is, therefor, a comparator and the displacement of the respective potentiometer slide is indicative of the comparision made.

Particularly, the cylinder of unit 27 connects on one side to the left side of actuator piston 14, and the other side of differential pressure transducer 27 connects to the left side of actuator piston 15. The cylinder of transducer 28 connects on one side to the right side of piston 15 and on the other side to the right side of piston 16. The cylinder of transducer 29 connects on one side to the left side of piston 16 and on the other side to the left side of piston 17. The cylinder of transducer 30 connects on one side to the right side of piston 17 and on the other side to the right side of piston 14 which connection closes the loop.

It can readily be seen that each auxiliary cylinder has its piston subjected to the pressure of two comparable piston chamber portions of two actuators and thus compares them. Transducers 27 and 29 compare, in pairs, the left hand pressures in relation to the actuator pistons; transducers 28 and 30 compare also in pairs the right hand pressures. The alternating connections establishes the loop.

Each of the transducers furnishes an electrical signal which is representative of the pressure comparison made. If one assumes for the sake of simplicity that each potentiometer is connected at both ends to sources of equal potentional but of opposite sign, and if one further assumes that in the case of equal pressure as monitored by the respective sensing piston 31b, the potentiometer tap is centered, then the signal given off by the transducer in that case should be zero particularly indicating normal, faultless operation.

Whenever an imbalance is sensed between comparable and compared actuator piston chambers, the respective potentiometer tap is shifted, and depending on the sign of the difference in pressure monitored a positive or negative error signal is issued by the respective transducer. These transducer signals are processed in a logic 35 to provide for control signals for the amplifiers 36, 37, 38 and 39. The signal processing may be carried out as follows.

Assuming transducer 28 senses an imbalance in that e.g. the pressure in the right hand chamber of 11 is larger than the pressure in the right hand chamber of 12, this imbalance may have been caused either by and in actuator 11/15 or by and in actuator 12/16. In other words, the pressure in the right hand chamber of 11 may be too high or the pressure in chamber 12 is too low. If the pressure in other right hand chambers such as the right hand chambers in clyinders 10 and 13 are the same as in 12, then the pressure in the left hand chamber of 11 is in fact too high. If the pressures in these chambers of 10 and 13 are the same as in the right hand chamber of 11, then the pressure in the right hand chamber of 12 is in fact too low. The distinction among these possibilities must be made because in the first case, actuator rod 18 was in fact shifted slightly too far to the left and in the other case rod 18 was shifted too far to the right. Proper correction remedies the situation, but for this one has to find out first which actuator produces an error, 11/15 or 12/16.

If concurrently to the assumed response of transducer 28, the transducer 29 gives off a signal indicative of an imbalance as between the left hand side of piston 16 and the left hand side of piston 17, the conclusion is warranted that unit 12/16 is the culprit. However, one knows even more. If the sign of the signal from transducer 29 indicates lower pressure on the left side of piston 16 than on the left side of piston 17, the presumption is warranted that the overall pressure for actuator 12/16 is too low, and appropriate steps can be taken, such as increasing the supply pressure for that actuator. Additionally, however, one can say that this error did not influence the control accuracy.

The other possibility is indicated by a reverse sign in the output of transducer 29, indicating that the left hand pressure on piston 16 is too high. This then is an indication that the position of piston 16 in chamber 12 does not correspond to the position it should have on the basis of the control as was applied to valve 21 by amplifier 38.

The two signals of transducers 28 and 29 indicating that the pressure on the left hand side of piston 16 is too high, but too low on the right hand side are combined in an additional input signal to amplifier 38 for control of valve 21 to remedy the situation, increasing the pressure on the left hand side of piston 16 and/or decreasing it on the right hand side thereof.

FIG. 1a is a representative example of the portion of logic and error signal circuit providing corrective control for amplifier 38. The two potentiometer signals are combined in that opposite polarities are paired. The two threshold amplifiers 81 and 82, one of them inverting, respectively respond to a negative signal of the potentiometer 32 of transducer 28 and a positive signal from potentiometer 32 of transducer 29, once a threshold has been exceeded in both cases. The resulting outputs are treated as logic signals and pass to an "and" gate 83.

Analogously, threshold amplifiers 84 and 85 respond to transducer signals of the respective opposite polarity and their logic outputs are combined in an "and" gate 86. The outputs of gates 83 and 86 are or'd in 87 and gates 83, 86, and 87 taken together can be regarded as an exclusive-or gate circuit whose output turns on a differential amplifier 88. This amplifier receives oppositely poled signals at direct and inverting inputs so that, in fact, it sums the amplitudes of the signals it receives with a polarity of the output that is equal to the polarity of the signal at the non-inverting input. That output signal is fed to the third input of amplifier 38 to be effective therein for controlling valve 21 of actuator 12/16 in a manner that causes the transducers 28 and 29 to re-center their potentiometers.

In terms of logic signals attached to the transducers, and if we call the signal representing the high pressure in the right chamber of 11 as monitored and indicated by transducer 28, by the same symbol, 28, and the low pressure in the right chamber of 12 as indicated by transducer 29, by the symbol $\overline{29}$, then $28.\overline{29}$ represents logically the situation requiring a specific signal for amplifier 38. If the pressure imbalance were reversed, the situation would be represented symbolically by $\overline{28}.29$, and that would require the specific signal for amplifier 38 to have opposite sign.

The logic situation $28.\overline{29} + \overline{28}.29$ is the exclusive-or function realized by the gates 83-86-87. For purposes of completeness, $28.\overline{29}$ would represent too low a pressure for actuator 12/16, while $\overline{28}.29$ would represent excess pressure in the actuator.

One can readily see, that the transducer outputs have been paired for all "adjacent" pairs of actuators in that 29 and 30 together monitor actuator 13/17; 30 and 27 monitor actuator 10/17; and 27 and 28 monitor actuator 11/15.

The circuit 35 may include a timing unit or other means for monitoring excess errors. For example, if the error discovered is not due to a significant defect in the respective actuator, balance should be restored shortly. In other words the transducer outputs 28 and 29 in the assumed example should both go to zero (or drop below the response thresholds of amplifiers 81, 82 etc) after the amplifier 38 has controlled valve 21 for causing the pressure or piston 16 to change. This is a feedback operation because transducers 28 and 29 should respond as stated so that the augmenting control introduced on amplifier 38 should cease. If it does not, the error may be more serious. Either by way of timing the duration of an error signal by a transducer or by way of amplitude discrimination one can determine the more serious fault situation. For example, another threshold amplifier could be connected to amplifier 88 responding only when the summed signal at its input is too large (as to either polarity). This is the purpose of amplifier 89 whose input threshold determines the range of errors that can be controlled while any attempt to control a larger error should not be made. When amplifier 89 responds it provides a shut down signal to a valve 75 which turns off the hydraulic supply to actuator 12/16.

The circuit 35 includes of course, similar circuits for control of the other error amplifiers 36, 37 and 39 and it includes additional threshold amplifiers analogous to 89 for control of valves 73, 74 and 76. These valves 73 to 76 when actuated, turn off the hydraulic supply to the respective hydraulic actuator. In the assumed example valve 75 interrupts the hydraulic supply for actuator 12/16.

Additionally, these valves 73 to 76 could be provided for pressure control in that, again in the assumed example, a situation represented by the logic function $28.29$ tends to increase the pressure and function $\overline{28}.\overline{29}$ will decrease the pressure in actuator 12/16, with complete shut off if e.g. within a specified period balance is not restored on the transducers inputs or if the amplitude of the transducer signal exceeds a predetermined threshold. The logic function $28.29$ for example would be established by logically pairing the outputs of 81 and 85 and $\overline{28}.\overline{29}$ would be represented by logically pairing the outputs of 82 and 84.

Proceeding now to the second example of the present invention, (FIG. 2) again there are four piston chambers 10a, 11a, 12a, 13a with pistons for actuation. Respective two of them are connected serially, by means of common piston rods, 18a and 18b, and the two rods operate in parallel on a swivel 18c to obtain common actuation and displacement output at 18d.

Figure 2:
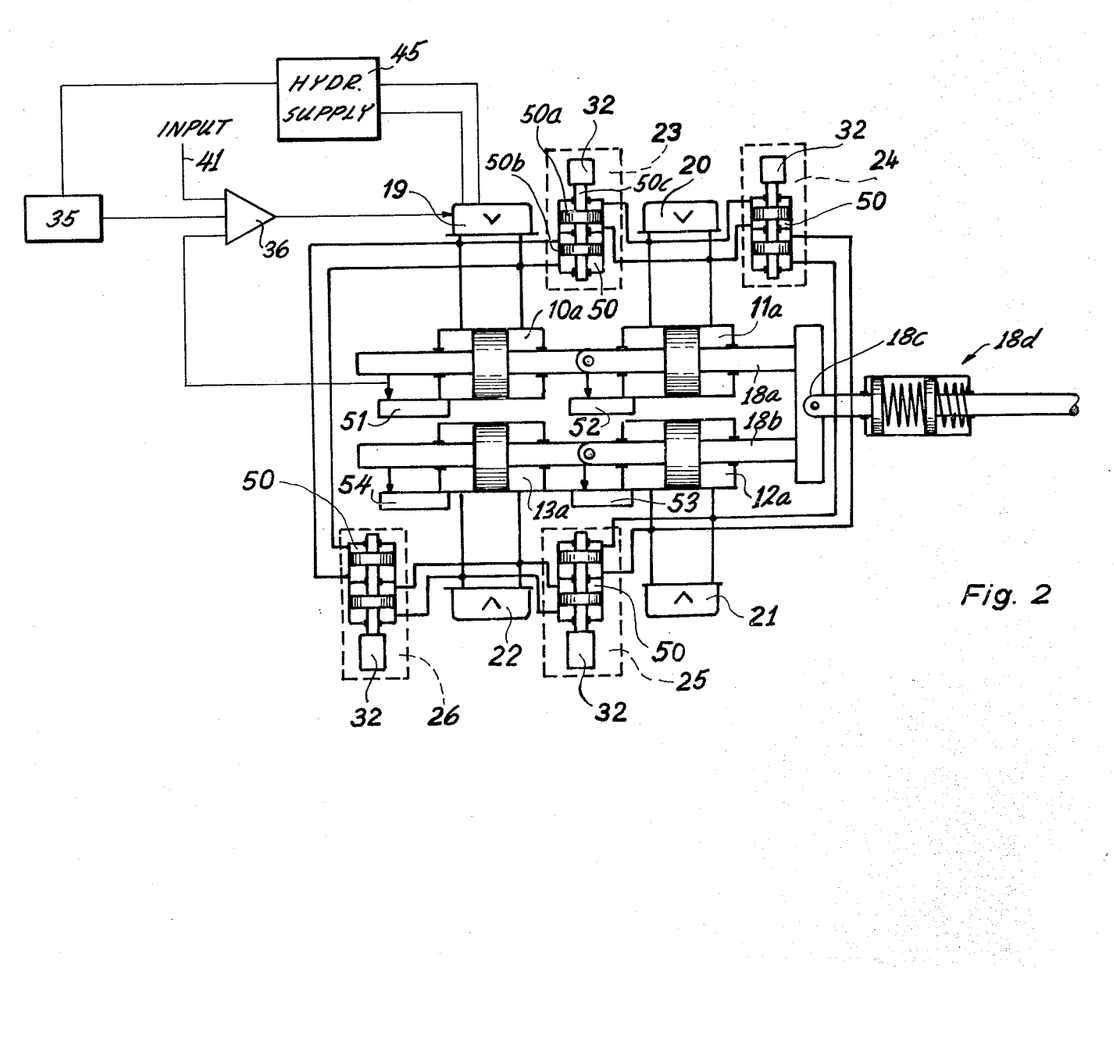
FIG. 2 is a representation similar to FIG. 1 but illustrating a second example.

The system includes a similar set of servo valves 19, 20, 21, 22 respectively controlling piston chambers 10a to 13a, and being controlled by amplifiers 36 etc, shown only partially but corresponding to amplifiers 36 to 39 of FIG. 1. The pistons of the actuators are connected individually to potentiometers 51, 52, 53 and 54 which again provide signals indicative in paris of the position of the respective piston rods. These signals are fed to the amplifiers 36 etc as before.

The several piston chambers 10a through 13a are supervised by a set of transducers and pressure differential pick up devices 23, 24, 25 and 26 which differ from the set 27 through 30 of FIG. 1. Each pick up device 23, 24 etc has a partition to establish a twin piston chamber — cylinder 50 with a double piston, 50a, 50b on a common piston rod 50c. The rod 50c displaces and positions the slide and tap of a potentiometer 32. The four chambers in cylinder 50, for example for the differential pick up 23 are connected as follows.

The two chambers, in the drawing, avove and below piston 50a (upper chamber of 50) respectively connect to the left and to the right of the piston in chamber 11a, while the two chambers above and below piston 50b respectively connect to the left and to the right of the piston in chamber and cylinder 10a. Analogous connections are made between the four chambers in pick up 24 and the chambers 11a and 13a; between the four chambers in 26 and the chambers 13a and 12a; and between the four chambers in 25 and the chambers 12a and 10a.

The connections as made in this manner eliminate response to excess or below-normal pressure of the hydraulic fluid as directly applied to any actuator unit. This is not a detriment as hydraulic fluid pressure may be monitored separately anyhow. On the other hand this supervision permits inherently a different kind of balancing control, avoiding balance control operation to take place merely for compensation for normal tolerances.

Take for example transducer and pick up 23, in conjunction with the piston rod 18a as acted on by the two pistons of cylinders 10a and 11a. Following a command, rod 18a will have a disposition which may then result in an averaging of forces on the two pistons. As a consequence the pressure to the left of the piston in chamber 10a may be slightly higher than to the right, while the reverse situation prevails with respect to the piston in chamber 11a. Now tracing these pressure differentials to the pick up cylinder and double piston in device 23, one will readily see that the imbalance in chamber 10a tends to move the double piston down, while the imbalance in chamber 11a tends to move the double piston up. Since the imbalances are assumed to be the result of averaging, they are equal and potentiometer 32 is not moved. Thus, an imbalance resulting merely from averaging will not effect the potentiometer in pick up — transducer 23. This was not true in FIG. 1 and, as a consequence, the response threshold for initiating control action can be lower with this kind of double piston pressure differential sensing device.

The same as the foregoing applies with regard to pick up 26 which will not respond to averaging imbalances on rod 18b merely due to small tolerances.

The situation is different when imbalance is actively introduced, not necessarily due to faultiness severe enough to bring about shut down. In such a situation the imbalance on the one actuator piston, say in chamber 10a, will tend to move the piston rod 50c of pick up transducer 23 and the piston rod 50c of pick up transducer 25 in similar directions. This is not essential per se, but of course consistency within the system is desirable. Thus, using the same logic notation as above, 23.25 will indicate one imbalance of the actuator piston in cylinder 10a while $\overline{23.25}$ indicates the oppositely directed imbalance. The control amplifier for servo 19 will be operated accordingly.

A word should be said here about the specific advantage of using a comparison loop and specifically comparing actuator cylinders with each other by means of double piston — differential pressure sensing units. The assumed error situation (involving actuator cylinder 10a) and the indication thereof depends on an imbalance as sensed on opposite sides of the same actuator piston. In other words the operative displacement of the transducer piston rods in units 23 and 26 in the assumed example depended on the imbalance as transmitted onto the respective piston 50b in either transducer. The differential mode as employed for providing for comparisons among the "hydraulic situations" in respective two "neighboring" actuators (as a result of the loop) has the advantage of eliminating the averaging effect from the indication, as resulting from the combining of actuator piston rod outputs. This was already mentioned above.

Another advantage of using double differential pistons in the pick-ups and comparators is the following. If averaging of operation of the two lower actuators on piston rod 18b brought about a dislocation in the same direction, the disposition of rods 18a and 18b together will not be averaged on the common output. This then is reflected in the comparisons made by units 26 and 24, which will not balance, so that the potentiometer displacements may be indicative of a slightly above response threshold error. It is optional whether or not to use this feature per se.

A more important result of using this type of pick-ups, 23 etc, is derived from the following consideration. In the case of a true error, for example, in unit 10a this additive effect of averaging e.g. as per comparator 26 offsets the error reducing effect of balancing the averaging of piston rod position as effective in transducer 23. In this way tolerances are eliminated from detection as a true error. If a true error is present and is not the result of tolerances, this error is developed in full by combining the outputs of the two transducers 23 and 26. Excessive imbalance and/or inability of the feedback to reduce the transducer signals to zero (or below tolerance level) will lead to shut down of unit 10a. The same can be said with respect to all other units. This aspect is the same as was described above with respect to FIG. 1.

The FIG. 2 shows another aspect of the invention which could find utility in all embodiments. The turn off signal from control box 35 is applied representatively to a hydraulic supply control 45 which may include valves such as 73, 74 etc. Additionally this Figure represents the possibility of having each actuator supplied from a different source of hydraulic pressure. The aircraft may have several hydraulic supply systems and a corresponding number of actuators may be connected individually and separately to these supply systems. If there are more actuators, additional auxiliary pumps may be provided. When such an actuator is turned off, the respective pump should be turned off also.

It can readily be seen that the comparison of the pressure conditions of two actuators in a ring or loop arrangement fashion permits pin pointing the particular actuator which is out of step as compared with the others, either requiring modification in its control, if possible, without change in the control conditions for the others, or requiring shut down when the augmented control does not or cannot be expected to remedy the situation. The supervising loop and ring is carried out by comparators operating on a hydraulic basis. One can, however, provide also for a different kind of comparison as will be explained next with reference to FIG. 3.

Figures 3, 3A:
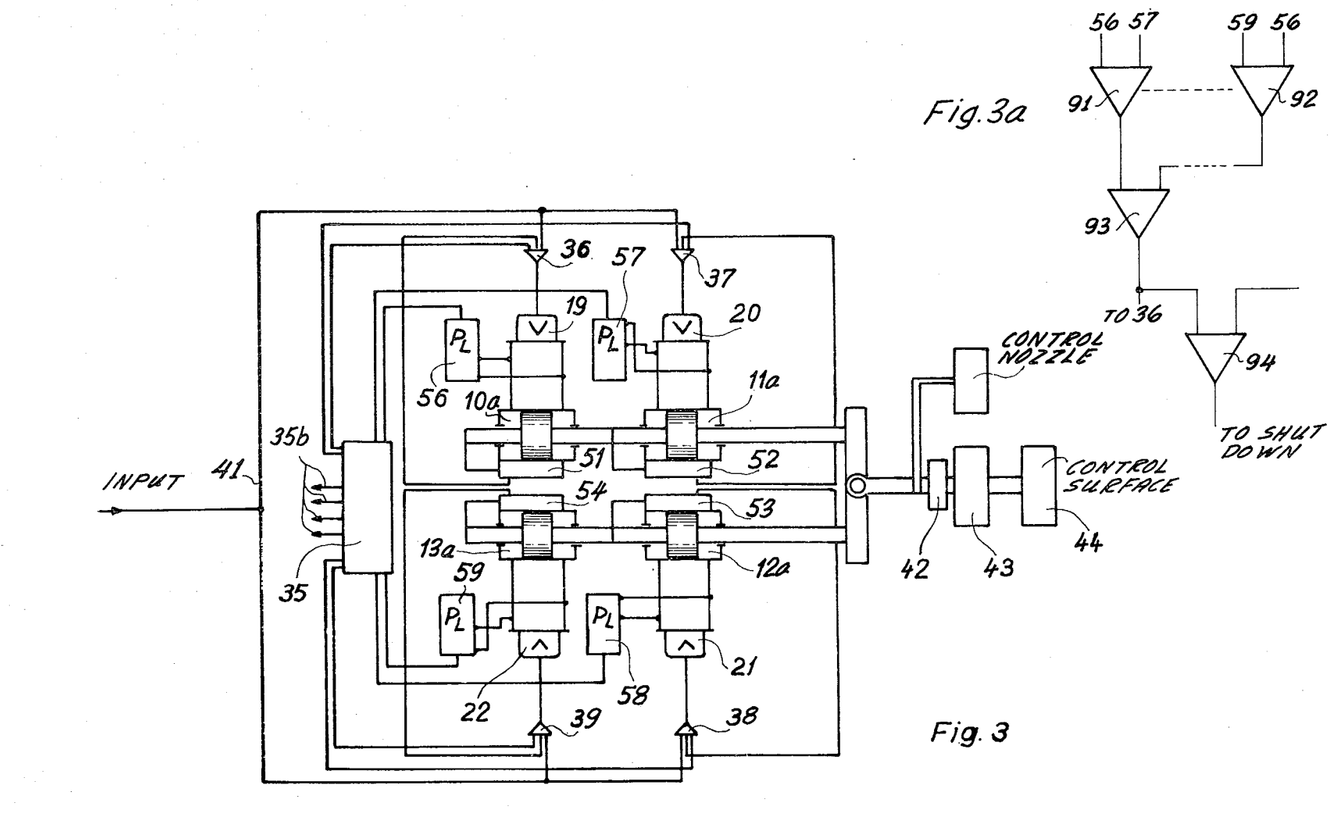
FIG. 3 is a modification of the actuator system of FIG. 2.
FIG. 3a is a circuit diagram included in the device of FIG. 3.

The actuator piston and cylinder arrangement and actuator output rods etc in FIG. 3 are similar to FIG. 2. The same is true with regard to the servo valves and the control amplifiers 36 to 39 have been included in the illustration. The supervision, however, is a different one. Four pressure cells, gauges or pick ups 56, 57, 58 and 59 are provided respectively connected to monitor load pressure in the cylinders 10a, 11a, 12a, 13a. Each monitor 56 to 59 produces a signal accordingly. The comparison is made now electrically in that the pressure or pressure differential on each actuator cylinder is compared with another one. Thus, the signal of 56 is compared with the signal of 57, the latter with the signal from 58, the latter with the signal from 59 and the latter with the signal from 56 to close the ring. The four signals can be termed 56-57; 57-58; 58-59; 59-56. These signals are comparable respectively to the outputs of transducers 23, 24, 26, 25 and are then compared with each otehr, again in pairs, to pin point a faulty actuator.

The circuit 35 provides for these signal processing operations and furnishes four outputs to the amplifiers 36 to 39, one at a time per actuator, to obtain the needed control. The output lines 35b provides for shut down when the comparisons yields excessive and/or excessively lasting errors in the operation of one actuator.

FIG. 3a is a representative example of the supervisory control as it is effective on the actuator of cylinder 10a. An amplifier 91 compares the pressure differential, if any, in chamber 10a as monitored by transducer 56 with the pressure differential as monitored by transducer 57, while amplifier 92 compares the pressure differentials as provided by transducers 56 and 59. These differentials, so compared, are additively combined in an amplifier 93, and if the sum formed therein exceeds a predetermined threshold, amplifier 36 receives a control signal of one polarity or the opposite to control servo valve 19 of the actuator unit of cylinder 10a accordingly. The amplifier 94 responds to a higher threshold level to obtain shut down of this actuator if the error level indicates uncompensatable error.

One can readily see, that additional comparison can be made electrically, setting up in effect additional loops, independently from any order. Thus, the circuit 35 may also establish the pressure differential 56-59 and 57-58. This would make it desirable to have the input of an amplifier corresponding to 93 be established by three comparisons.

Figure 4:
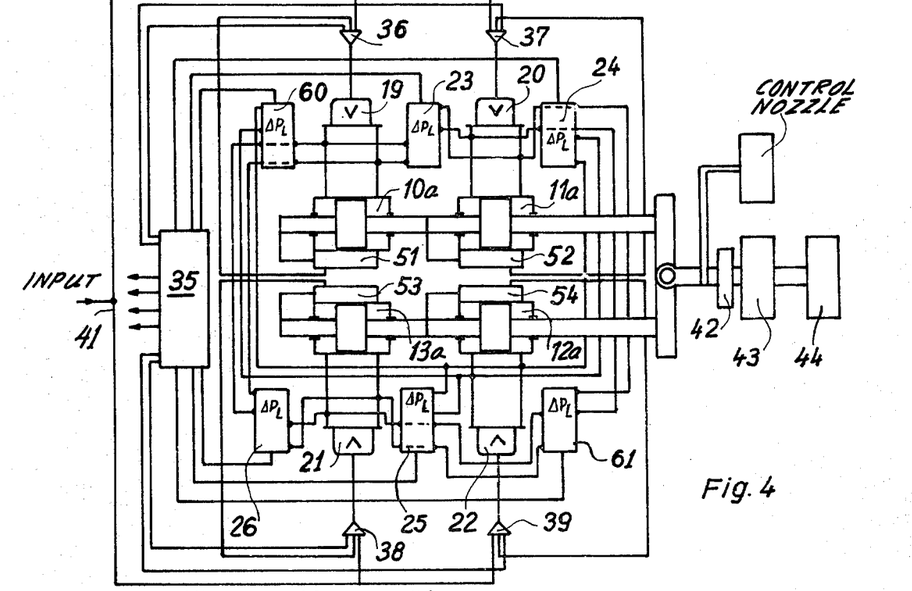
FIG. 4 is another modification of the actuator system of FIG. 2.

Using additional comparison circuits has the added advantage that in the case of shut down of one actuator a sub-ring is still maintained among the remaining three units. More on that aspect will be developed with reference to FIG. 4 showing additional comparisons to be made on a hydraulic basis. The development of comparison signals hydraulically or electrically is deemed equivalent within the context of this invention.

The apparatus shown in FIG. 4 includes the components of FIG. 2 and here particularly the pressure differential sensing, pick up transducers 23 through 26 as connected to the actuator cylinders for the comparison loop. In addition now, two similar pick up transducers 60 and 61 are provided, and are interconnected to cylinders so that in toto each cylinder is compared with all three others.

Figure 6:
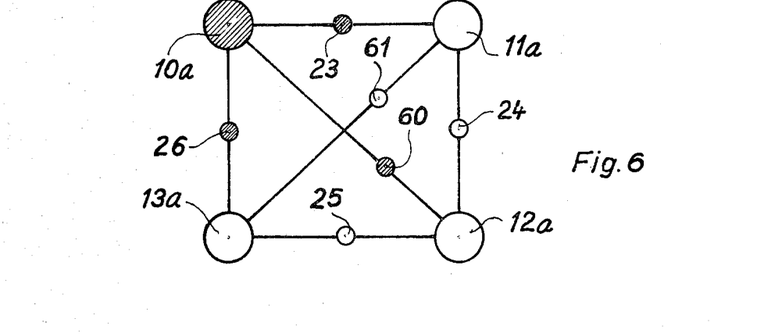
FIG. 6 is a schematic representation of the supervision system as realized in FIG. 4.

In particular, transducer 60 is connected to compare cylinder 10a with cylinder 12a and transducer 61 is connected to compare cylinder 11a with cylinder 13a. The arrangement is more easily discernibly depicted in FIG. 6 as far as the comparison loop and diagonal comparing connection per se is concerned.

If one assumes for example, cylinder 10a was found faulty and had to be disconnected, transducers 23 and 26, and also 60 do no longer provide for a meaningful comparison and their outputs indicate permanently a fault condition. The remaining three cylinders 11a, 12a and 13a, however, are still supervised in a ring comparator fashion namely by the transducers 24 and 25 as before with transducer 61 closing the loop. A faulty one among these three can, therefor readily be pin pointed through evaluation of the outputs of the three transducers in that response of any two points to the faulty cylinder as before.

Since the transducers 23, 25 and 60 are set to indicate a faulty condition, response of transducer 24 alone is also sufficient to pin point cylinder 11a as faulty (or as requiring supplemental control action by its servo valve). However, the inclusion of the additional transducers 60, 61, and the presence particularly of transducer 61 for establishing a sub-loop is a preferable mode of operation because a transducer may also drop out. The diagonal transducers 60 and 61 are particularly useful in an arrangement having transducers as shown in FIG. 1 because without these additional transducers one side of each of two cylinders (after drop out of one) remain unsupervised.

Figure 5:
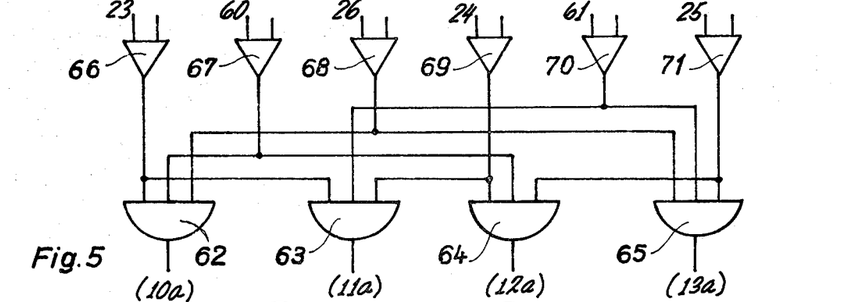
FIg. 5 is a circuit diagram of a logic circuit showing processing of signals developed in the device of FIG. 4.

The error logic for FIG. 4 is depicted in FIG. 5. Reference numerals 66 to 71 refer respectively to amplifiers which convert the potentiometer output signals as derived from the six transducers 23 to 26 and 60, 61 into logic signals, whereby an adjustable threshold separates the "zero" from the "one" state. The threshold may be established through common or individual bias as indicated by a second input for each of the amplifiers.

The outputs of the amplifiers are combined, making use of the fact that by virtue of the additional transducers 60, 61, three transducer outputs are available for indicating faultiness of a cylinder. The "and" gate 62 combines the outputs of transducers 23, 26 and 60, and response of all three is indicative that cylinder 10a is faulty. "And" gate 63 combines the outputs of transducers 23, 24 and 61 for an indication as to whether or not cylinder 11a is faulty. The analogous supervisory functions are carried out by gates 64 and 65 for cylinders 12 and 13. The output signals of these gates can then be used for shut down of the respective cylinder.

It should be noted that following a shut down, the output signals from the respective three transducers are permanently on the fault indicating level. This then reduces the three "and" gates supervising the remaining three cylinders to two-input gates, the third input is held permanently to the true level.

The invention is not limited to the embodiments described above but all changes and modifications thereof not constituting departures from the spirit and scope of the invention are intended to be included.

We claim:

1. Apparatus for supervising an electro-hydraulic actuator system having a plurality of at least three individual piston-cylinder actuators, wherein the pistons are interconnected to operate on a common load, and each cylinder is pressure-controlled by a separate electro-hydraulic controller comprising:

comparator means connected to each of the cylinders of the plurality to compare the pressure in each of the cylinders of the plurality respectively with the pressure of at least two other cylinders of the plurality for obtaining a closed loop of comparisons, each resulting in an output and wherein at least two output signals indicate in each instance when operations of a piston of a cylinder actuator differs from the operation of the pistons of the other piston-cylinder actuators of the plurality; and means connected to be responsive to the outut signals for obtaining control of the respective actuator

11 to balance the operation of the respective cylinder or to shut it down in dependence upon the magnitude of the difference in operation as indicated by the output signals of the comparator means.

2. Apparatus as in claim 1 for more than three actuators wherein the comparator means provide for comparison of each actuator with all other actuators of the plurality.

3. Apparatus as in claim 1, wherein the comparator means includes a plurality of hydraulic comparators, each comparator having two chambers respectively connected to one side and the other side of a piston therein and connected to two piston chambers respectively of two actuators of the plurality which are being compared in that the respective pistons of the actuators reduce or increase the pressure in the chambers in unison when operated.

4. Apparatus as in claim 1, wherein the comparator means includes a plurality of double cylinder-double piston units and being connected to duplicate the pressure on the pistons of two actuators and providing a differential displacement.

5. Apparatus as in claim 1, wherein the comparator means includes individual pressure probes for the actuator cylinders, providing electrical outputs indicative of the operational state of the cylinders; and circuit means for providing for the comparison of each said electrical output as indicative of the operational state of the respectively associated cylinder of the plurality, with the outputs of two other ones of the pressure probes.

6. Apparatus for supervising a plurality of electro-hydraulic actuators operating on a common output, each actuator having a piston chamber and a piston dividing the piston chamber into a first and second chamber, the first chamber of all piston chambers increasing upon advance of the common output, the actuators of the plurality being connected for control by a common input, comprising:
a plurality of electro-hydraulic comparators each including a differential piston, and connected to the actuators wherein the connection includes a differential connection of one of the plurality of comparators between the first chambers of two actuators, a second one of the plurality of comparators being connected differentially between the second chamber of one of the two actuators and the second chamber of a third one of the actuators, a third one of the plurality of comparators being connected between the first chamber of the third one and of another one of the actuators, and wherein a last one of the plurality of actuators has its second chamber connected to the second chamber of the first one of the actuators via a last one of the differential comparators so as to establish a closed loop as between all comparators and all actuators of the respective pluralities;
first electrical circuit means connected to the comparators and being adjusted by the respective differentially operated pistons for producing electrical output signals respectively indicative of the disposition of the differentially operated pistons of the comparators;
second electrical circuit means connected to the first circuit means, to be responsive to the outputs in pairs as derived from the comparators connected to the same actuator for establishing an electrical

12 criterium for each of the actuators, whether or not the respective actuator is operated; and
third circuit means connected to the second circuit means and controlling the actuators individually in dependence upon the established criterium for balancing operation of all actuators of the plurality.

7. Apparatus as in claim 6, wherein the first circuit means includes an adjustable circuit element for each of the comparators;
the second circuit means including circuitry respectively connected to the adjustable circuit elements for two comparators being connected to the same actuator of the plurality;
the third circuit means including a summing amplifier receiving the command signal, a feed-back signal indicative of the disposition of the actuator and a signal from the circuitry for providing corrective control.

8. Apparatus for supervising a plurality of electro-hydraulic actuators operating on a common output, each actuator having a piston chamber and a piston dividing the piston chamber into a first and a second chamber, the first chamber of all piston chambers increasing upon advance of the common output, the actuators of the plurality being connected for control by a common input, comprising:
a plurality of electro-hydraulic comparators, each having a pair of pistons on a common piston rod, each piston disposed in differential chambers, the comparators connected with one of the differential chambers of the first and second chamber of one of the actuators, and with the respective other differential chambers of the first and second chambers of another one of the actuators, so that the comparators interconnect the actuators for establishing a closed sensing loop in which each actuator is connected to two comparators;
a plurality of adjustable circuit elements respectively connected to and operated by the piston rods of the comparators;
circuit means connected to the adjustable circuit elements to be responsive to the adjustments thereof and providing output signals, respectively representing the adjustment of two adjustable elements connected to two comparators, which are connected to the same actuator of the plurality; and
means for controlling the actuators respectively in response to said output signals.

9. Apparatus as in claim 8, including additional circuitry for controlling shut down of an actuator of the plurality on response to output signals indicative of faulty actuator operation.

10. Apparatus as in claim 9, including a plurality of additional, similarly constructed comparators, so that together with the first mentioned plurality of comparators each actuator is connected to all other actuators via one of the comparators of the pluralities.

11. Apparatus for supervising a plurality of electro-hydraulic actuators, each having a piston and cylinder, the pistons of the several actuators being interconnected to provide for a common displacement output, the combination comprising:
a plurality of comparators, each connected to compare the hydraulic pressure state of a cylinder of one actuator with the hydraulic pressure state of a cylinder of another actuator, whereby each actuator of the plurality is connected to two different comparators of the plurality to obtain a closed comparison loop, each comparator providing an electrical output;

circuit means respectively connected for combining the outputs of the two comparators connected to the same actuator to obtain an electrical signal indication of the operational condition of the actuator;

means responsive to the electrical signal indication when indicating a relatively small error for controlling the respective actuator; and means responsive to the electrical signal indication when indicating a relatively large error to turn the actuator off.

12. Apparatus as in claim 11, wherein the comparators each include a differential piston arrangement operatively connected to the respective two comparator cylinders; and an adjustable circuit element operated by the differential piston to provide an electrical output indicative of the comparator output.

13. Apparatus as in claim 12, wherein each comparator has two serially connected differential pistons, each of the latter pistons being respectively operated from both sides of the actuator piston in the respective actuator cylinder.

14. Apparatus as in claim 12, wherein each comparator as connected to the respective two actuator cylinders is connected to comparable sides of the respective pistons therein.

15. Apparatus as in claim 11, wherein the comparators each include two pressure sensing devices, respectively connected to the actuator cylinders and providing an electrical output, and circuit means combining the outputs of the pressure sensing device to obtain the respective comparator output.

16. Apparatus as in claim 15, wherein the comparators connected to the same actuator of the plurality share the respective pressure sensing device.

* * * * *